(12) United States Patent
Mockett

(10) Patent No.: US 6,877,184 B2
(45) Date of Patent: *Apr. 12, 2005

(54) GROMMET

(76) Inventor: Douglas A. J. Mockett, 3504 Via Campesina, Palos Verdes Estates, CA (US) 90274

( * ) Notice: Subject to any disclaimer, the term of this patent is extended or adjusted under 35 U.S.C. 154(b) by 0 days.

This patent is subject to a terminal disclaimer.

(21) Appl. No.: 10/736,513

(22) Filed: Dec. 17, 2003

(65) Prior Publication Data

US 2004/0123420 A1 Jul. 1, 2004

Related U.S. Application Data

(63) Continuation of application No. 10/113,672, filed on Apr. 2, 2002, now Pat. No. 6,694,566, which is a continuation of application No. 07/901,684, filed on Jun. 22, 1992.

(51) Int. Cl.[7] ................................................ F16L 5/00
(52) U.S. Cl. ................. 16/2.1; 174/152 G; 174/153 G; 248/56; 312/223.6; 411/508
(58) Field of Search ............................ 16/2.1, 2.2, 2.4; 174/156, 153 G, 65 G, 48, 152 G; 248/56; 312/223.1, 223.6, 327; 411/508, 509

(56) References Cited

U.S. PATENT DOCUMENTS

| | | | |
|---|---|---|---|
| 3,783,175 A | 1/1974 | Timmons | |
| 3,857,136 A | 12/1974 | Dean | |
| 3,956,573 A | 5/1976 | Myers et al. | |
| 4,053,701 A | 10/1977 | Ogilvie et al. | |
| 4,344,205 A | 8/1982 | Latino et al. | |
| 4,520,976 A | * 6/1985 | Cournoyer et al. | 248/56 |
| D285,044 S | 8/1986 | Mockett | |
| 4,688,491 A | * 8/1987 | Herrera et al. | 108/50.02 |
| 4,721,476 A | 1/1988 | Zeliff et al. | |
| 4,730,363 A | 3/1988 | Asbaghi et al. | |
| D296,761 S | 7/1988 | Mockett | |
| D298,494 S | 11/1988 | Mockett | |
| 5,144,777 A | 9/1992 | Fishel et al. | |
| 5,167,047 A | 12/1992 | Plumley | |
| D354,903 S | 1/1995 | Mockett | |
| D358,980 S | 6/1995 | Mockett | |
| 6,694,566 B1 | 2/2004 | Mockett | |

OTHER PUBLICATIONS

Answer of Defendant Doug Mockett, Counterclaim for Patent Infringment and Demand for Jury Trial, Case No. 2:04–cv–02868–GHK–Ex.
Complaint for Damages and Injunctive Relief for Patent Infringement, Case No. CV04–2868.
Request for Reexamination of U.S. Patent No. 5,167,047 dated Jan. 13, 2004.
Notice of Motion and Motion to Lift Stay of Action dated Jul. 9, 2004.
Opposition of Plaintiff to Defendant's Motion to Lift Stay of Action dated Jul. 26, 2004.
Reply to Opposition to Motion to Lift Stay of Action dated Aug. 2, 2004.
Civil Minutes–General of Hon. George H. King dated Aug. 24, 2004.

(Continued)

Primary Examiner—Chuck Y. Mah
(74) Attorney, Agent, or Firm—Miles & Stockbridge P.C.; James T. Carmichael

(57) ABSTRACT

This invention relates to a two-piece grommet adapted for holding a cable in an aperture, such as in a desk or work surface so as to absorb any strain imposed on the cable and to provide an attractive covering for the hole drilled to pass the cable. The grommet consists of two portions. The first portion comprises a cylindrical sleeve having a circular lip. The second portion comprises a cap having an extended flange and adapted to frictionally fit into the cylindrical sleeve and against the lip. The cap has an aperture cut into it through which the cable passes. A pivotal tab is connected under the cap to close the aperture when no cable passes therethrough.

14 Claims, 1 Drawing Sheet

OTHER PUBLICATIONS

Answer of Defendant Doug Mockett, Counterclaim for Patent Infringement and Demand for Jury Trial dated Sep. 28, 2004.
Reply Brief for Appellant Douglas Alfred James Mockett dated Dec. 20, 1999.
Brief for Appellee Roger Plumley dated Dec. 1, 1999.
Brief for Appellant Douglas Alfred James Mockett dated Oct. 21, 1999.
Exhibit 47 from Interference No. 103,260, dated Jan. 29, 1991 (3 pages).
Exhibit 48 from Interference No. 103,260, dated May 6, 1991 (6 pages).
Exhibit 51 from Interference No. 103,260, dated May 14, 1991 (1 page).
Deposition of Roger Plumley taken Mar. 11, 1994, and exhibits thereto.
Doug Mockett & Co., "Annual Report to Our Clients and Friends," pp. 4 and 5 of 1989 stock catalog.
ITW Plastiglide "Stock Catalog, " cover, inside cover, and pp. 67–70, 1990.
New Products from Mold Rite Inc., 1 sheet, 1990.
Weber Knapp Company "Cord Grommet" cover and inside cover, 1990.
E.B. Bradley Co., "Specialty Hardware and Laminate," p. 262 (1 sheet), 1990.
The Slidex Corp., "Wire Management Products" cover sheet.
Outwater Plastic/Industries "Round Wire Management Grommets," 1990.
Joint Appendix, *Plumley* v. *Mockett,* Appeal No. 99–1486.
Ruling and Statement of Decision, *Doug Mockett & Co.* v. *Roger Plumley,* Superior Court of California, County of Los Angeles, No. BCO94386 (8 pages).
Final Decision Under 37 C.F.R. § 1.658, *Mockett* v. *Plumley,* Interference No. 103,260, Sep. 4, 2001 (19 pages).
Request for Reexamination of U.S. Patent No. 5,167,047.
*Douglas A. J. Mockett* v. *Roger K. Plumley,* "Amended Complaint By Original Inventor to Set Aside Decision of Board of Patent Appeals and Interferences", Civil Action No. 02–8271–R–VBKx.

* cited by examiner

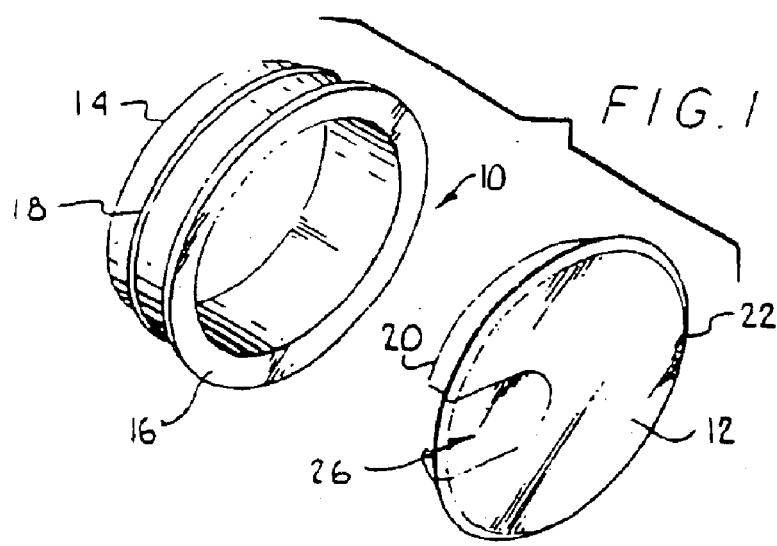
FIG. 1
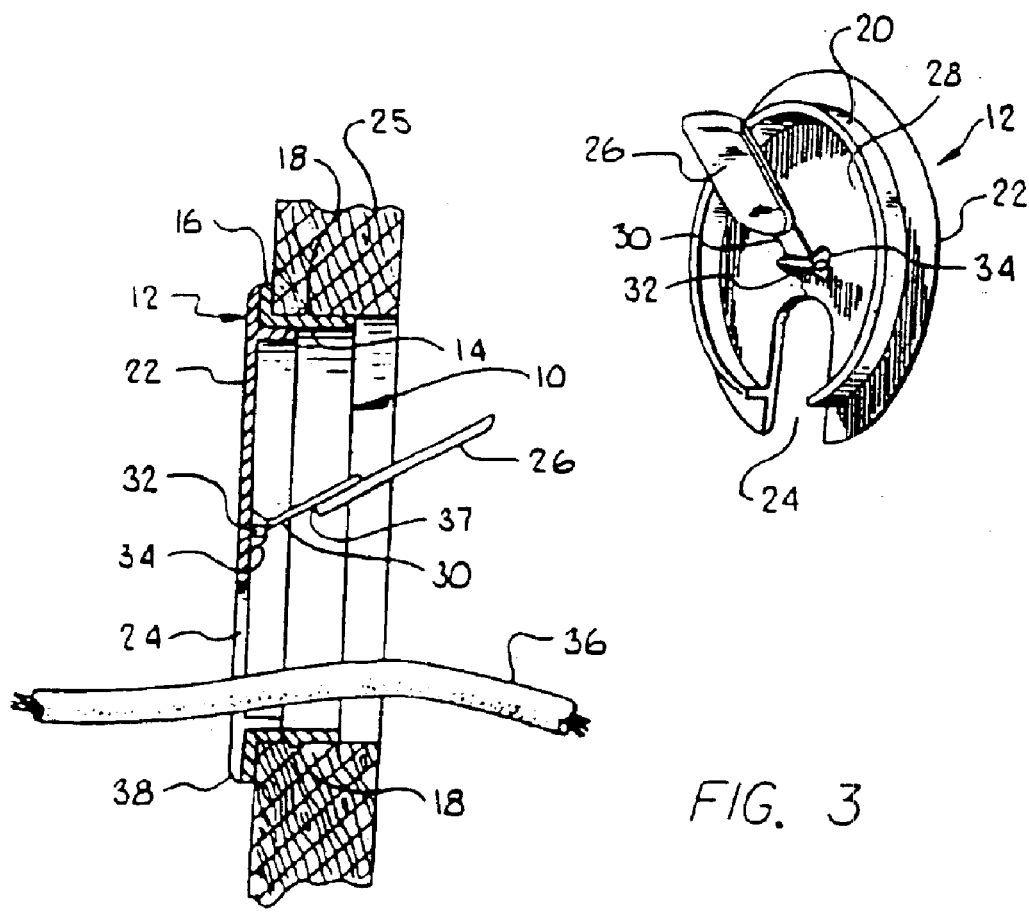
FIG. 2
FIG. 3

GROMMET

The present application is a continuation of U.S. patent application Ser. No. 10/113,672, filed Apr. 2, 2002 now U.S. Pat. No. 6,694,566, which is a continuation of U.S. patent application Ser. No. 07/901,684 filed Jun. 22, 1992, currently pending.

BACKGROUND OF THE INVENTION

Devices for passing a flexible or non-flexible cord, such as a telephone cord or computer cable, through one or more elements such as a desk top, a piece of furniture, a wall or other type of installation are well known. Various devices to do this are known in the art and each of these devices has drawbacks. One device, which is now being used, requires a spring loaded cap which is held in place within a sleeve by the action of the spring. This device is complex, expensive and difficult to use. Other devices consist simply of a cylindrical sleeve in which the hole in the panel or desk must be cut to precisely the exact size or the sleeve will simply fall out, particularly if it is set in a vertical position. If the hole is not cut to the precise size, means must be used to secure the sleeve into the hole.

OBJECTS OF THE INVENTION

It is an object of the present invention to provide a simple, improved device for passing a cable or cord through an aperture in a work surface securing the cord.

It is still a further object of the invention to provide a grommet capable of being held easily in a hole cut into a work surface, for passing an electrical cord.

Still a further object of the invention is to provide a grommet for holding an electrical cord which can be easily held and used in both a vertical and horizontal position.

Still a further object of the invention is to provide a means to close the hole when not in use.

These and other objects will be described by reference to the accompanying drawing in which:

FIG. 1 is a perspective view of the grommet assembly of the present invention.

FIG. 2 is a perspective view of the bottom of the cap portion of the present invention, and FIG. 3 is a side view partially broken away of the cap portion of the grommet of the present invention.

Referring now to the drawings, there is shown the sleeve portion 10 of the grommet of the present invention and the cap portion 12. The sleeve portion comprises a cylindrical hollow sleeve 14, and a lip 16 having a larger diameter than sleeve 14. Sleeve 14 optionally has a rib 18 slightly raised from the surface of sleeve 14. The cap portion of the grommet of the present invention comprises a shank portion 20 and a flange or lip portion 22. Cut into the cap 12 is an aperture or slot 24 through which will pass the electrical cable 36 which is held by the grommet of the present invention.

The shank portion 20 of the cap is of a diameter substantially equal to the inner diameter of the sleeve portion 10 so that the cap frictionally fits and is held in the sleeve portion 10. The flange 22 rests against lip 16.

A tab 26 is pivotably attached to the underside 28 of cap 12. Tab 26 is shaped so that it frictionally fits into slot 24. Thus, when no cable is passing through slot 24, tab 26 can be closed so that no opening appears in the cap 12 and it appears' to be a solid surface. Tab 26 fits tightly enough frictionally so that it stays in place in slot 24 until pushed down to reopen slot 24.

Tab 26 has a connecting arm 30 which has a male connector comprising an elongated cylinder 32 at the end thereof. Cylinder 32 snap fits into a female receiver portion 34 which holds cylinder 32 yet allows it to pivot. Cylinder 32 can be pulled, with mild force, out of receiver portion 34 so that tab 26 can be separated from cap 12, if desired, and replaced when needed. Thus, this design allows the user to swing tab 26 down and out of the way if desired or it can be removed entirely.

Arm 30 is attached under tab 28 creating a step 37. Step 37 is necessary to pivot tab 28 so that it is flush with the top surface of cap 12 while arm 30 remains underneath cap 12 and out of the way.

In using the device of the present invention, a hole is drilled or cut into the panel, wall, board, desk or work surface 25 through which the electrical cable 36 is to pass. The sleeve portion 10 of the present invention is then pressed into place in the hole with rib 18 forming a means for the sleeve portion 10 to be frictionally held in place even if it is in a vertical direction. The rib 18 also provides a means to hold the sleeve in place if the hole has not been drilled precisely to the correct size and is slightly too big. Rib 18 also acts as a dam to hold glue if it is desired to glue sleeve 10 in place.

The electrical cable 36 is then passed through the hole in the panel, wall, desk or work surface which now contains sleeve 10, and then cap 12, with tab 26 pivoted down and out of the way, is placed over the cable and pressed into place, so that shank 20 frictionally fits into and is held in the inside diameter of the sleeve 10.

The aperture 24 that is cut into the cap 12 can be made of a variety of sizes and shapes depending upon the size of the electrical cable to be passed through the grommet or the size of the hole in the desk. Tab 26, of course, must conform to the size and shape of aperture 24.

The lip 16 of sleeve portion 10 will rest on the flat portion of the wall, panel, desk or work surface, holding the sleeve portion 10 in place, so that it will not fall through the hole. The rib 18 will prevent the grommet from slipping back and forth within the hole in which it is placed.

An additional advantage of the lip 16 and the cap 22 is the fact that when holes are cut into walls or desks there are usually rough edges or chips in the wood, and lip portion 16 will cover these unsightly chips. On steel or metal surfaces, the grommet prevents cutting of the cable by a rough metal edge.

Referring specifically to FIG. 3, there is clearly shown a 90 degree angle between the sleeve 14 and the lip 16. This 90 degree angle allows the lip 16 to rest on the surface of the work surface.

In addition, there is shown a beveled edge 38 on cap 12. The beveled edge 38 not only is aesthetic but will allow the sliding of objects over the top of cap 12 with very little resistance.

The grommet of the present invention can be made of any convenient material, such as plastic, metal, or wood, but is preferably made of plastic since it is easiest to produce and also is a non-conductive material in the event of any electrical cables which may have a problem of shorting or shocking a potential user.

The grommet of this invention also has the adaptability that the sleeve portion 10 can be used without the cap portion 12 in the event any cable or cables must be passed through the hole that fill the entire inside diameter.

In addition, two sleeve portions 10 can be placed back to back to cover both the top and bottom or both sides of a hole in a work surface or wall. Caps 12 can be placed on one or both sides.

Having thus described the invention with reference to a preferred embodiment, it will be understood by those skilled in the art the various changes in form and detail may be made therein without departing from the spirit and scope of the invention.

I claim:

1. An article of manufacture comprising:
    a grommet cap having a substantially planar top side and a substantially planar underside, the grommet cap comprising:
        a flange extending to an outer edge of the grommet cap and having a dimension substantially larger than an aperture to be covered;
        a shank depending from the substantially planar underside of the grommet cap and having an outer surface configured substantially in conformance with the size and shape of at least a substantial portion of an inner surface of the aperture to be covered;
        a slot in the grommet cap extending through the flange to the outer edge of the grommet cap; and
        a female receiver depending from the substantially planar underside of the grommet cap; and
    a separable tab configured to fill the slot, the separable tab having a male connector, the male connector being dimensioned to fit at least partially into the female receiver such that the separable tab can be separated from the grommet cap by removing with mild force the male connector out of the female receiver,
    the separable tab being held under the grommet cap such that the separable tab may be downwardly pivoted away from the slot while the male connector continuously directly contacts the female receiver,
    the separable tab being moveable into at least the following three positions:
        a closed position in which the separable tab completely fills the slot and the male connector contacts the female receiver depending from the substantially planar underside of the grommet cap;
        an open position in which the separable tab is downwardly pivoted out of contact with the slot, the male connector is spaced apart from the slot, and the male connector contacts the female receiver depending from the substantially planar underside of the grommet cap;
        a separated position in which the separable tab is removed entirely from and does not contact the grommet cap.

2. The article of claim 1 wherein in the open position the male connector is held in close proximity to the substantially planar underside of the grommet cap.

3. The article of claim 1 wherein the female receiver is configured to permit the male connector to touch the substantially planar underside of the grommet cap at a time when the male connector is at least partially inside the female receiver.

4. A separable tab and grommet cap combination comprising:
    a grommet cap having a substantially planar top side and a substantially planar underside, the grommet cap comprising:
        a flange extending to an outer edge of the grommet cap and having a dimension larger than an aperture to be covered;
        a shank depending from the substantially planar underside of the grommet cap and having an outer surface configured substantially in conformance with the size and shape of at least a substantial portion of an inner surface of the aperture to be covered;
        a slot in the grommet cap extending through the flange to the outer edge of the grommet cap; and
        a female receiver depending from the substantially planar underside of the grommet cap; and
    a separable tab configured to fill at least a substantial portion of the slot, the separable tab having at least one male connector, the at least one male connector being dimensioned to fit at least partially into a portion of the female receiver in close proximity to the substantially planar underside of the cap such that the separable tab can be separated from the grommet cap by removing the at least one male connector out of the female receiver,
    the separable tab being moveable into at least the following three positions:
        a closed position in which the separable tab completely fills the slot and the at least one male connector contacts the female receiver under the substantially planar underside of the grommet cap;
        an open position in which the at least one male connector is spaced apart from the slot and the separable tab is removably held under the substantially planar underside of the grommet cap by the female receiver; and
        a separated position in which the separable tab is removed entirely from and does not contact the grommet cap.

5. The combination of claim 4 wherein the separable tab is pivotable between the closed position and the open position.

6. The combination of claim 4 wherein the combination is made of non-conductive plastic.

7. The combination of claim 4 wherein the at least one male connector is substantially cylindrical.

8. The combination of claim 4 wherein the at least one male connector is formed as part of a bar extending transversely across an end of the removable tab.

9. The combination of claim 4 wherein in the open position the separable tab is positioned at least about ninety degrees away from its closed position.

10. The combination of claim 4 wherein the female receiver comprises means for receiving the male connector.

11. The combination of claim 4 wherein the at least one male connector comprises means for connecting the separable tab to the female receiver.

12. The combination of claim 4 wherein the at least one male connector is holdable by the female receiver without sliding therebetween.

13. The combination of claim 4 wherein the separable tab is removable from the grommet cap with mild force.

14. The combination of claim 4, wherein in the open position the female receiver permits the at least one male connector to contact the substantially planar underside of the grommet cap.

* * * * *